July 17, 1956  J. F. JOY  2,754,765
VARIABLE DISPLACEMENT PUMP
Original Filed Jan. 29, 1949

INVENTOR:
JOSEPH F. JOY.
BY John F. Schmidt
ATTORNEY.

United States Patent Office 2,754,765
Patented July 17, 1956

2,754,765

VARIABLE DISPLACEMENT PUMP

Joseph F. Joy, Pittsburgh, Pa., assignor to Joy Manufacturing Company, Pittsburgh, Pa., a corporation of Pennsylvania Original application January 29, 1949, Serial No. 73,625, now Patent No. 2,696,906, dated December 14, 1954. Divided and this application September 14, 1951, Serial No. 246,605

4 Claims. (Cl. 103—120)

This invention relates to a variable displacement pump, particularly to a pump of the gear type, and is a division of my patent application Serial No. 73,625, filed January 29, 1949, now matured into Patent No. 2,696,906.

There are often industrial applications which require a positive displacement pump in which the displacement can be varied. One such application is shown in the above-identified patent, but it will of course be understood that a pump made according to this invention is not limited to applications such as that shown in the patent referred to.

It is accordingly an object of this invention to provide a positive displacement pump in which the displacement is variable; more specifically, it is an object of this invention to provide a variable displacement pump which is responsive to pump discharge pressure. These and other objects are accomplished in a gear type pump in which one of the gears is so mounted as to permit movement thereof along the line of centers of the two pump gears, such movement being effected in response to an excessive pump discharge pressure and being opposed by a substantially constant force.

Figure 1:
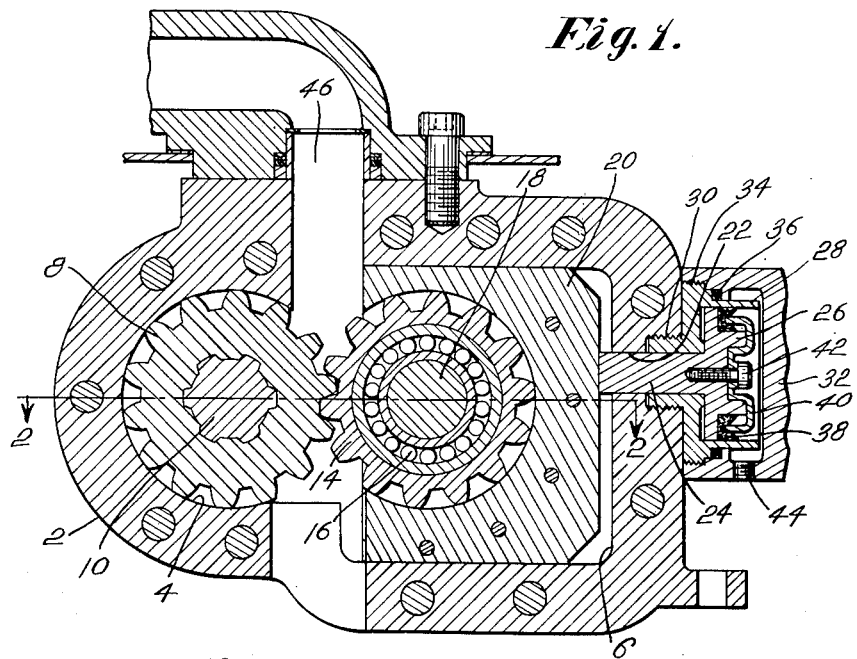
Fig. 1 is a view in section through a pump made in accordance with this invention.

Reference is now had to the drawings for a description in detail of a pump made according to this invention. The pump has a pump casing 2 provided with a substantially circular recess 4 at one end thereof and a substantially rectangular recess 6 at its other end. A gear 8 is mounted for rotation in the recess 4 and is keyed to motor shaft 10, which is rotatably supported in antifriction bearings 12.

Meshing with drive gear 8 is a follower gear 14 which is mounted for rotation in antifriction bearings 16 on a short shaft 18. Shaft 18 is in turn supported in a block 20 which has limited movement in the rectangular recess 6 in a direction parallel to a line connecting the axes of rotation of gears 8 and 14.

Gear casing 2 is provided at its right end with a bore 22 in which a piston rod 24 has a sliding fit. One end of rod 24 abuts against the right hand face of block 20, and at the other end of piston rod 24 there is a piston 26 adapted to reciprocate in a cylinder 28; the cylinder is held in place by a threaded boss 30 secured in a threaded recess in the gear casing. A cylinder head 32 threadedly engages the cylinder 28 at 34. Suitable sealing means 36 are provided between the cylinder and the cylinder head, and suitable piston packing 38 is held in place by a washer 40, which itself is secured to the piston by a threaded member 42.

Figure 3:
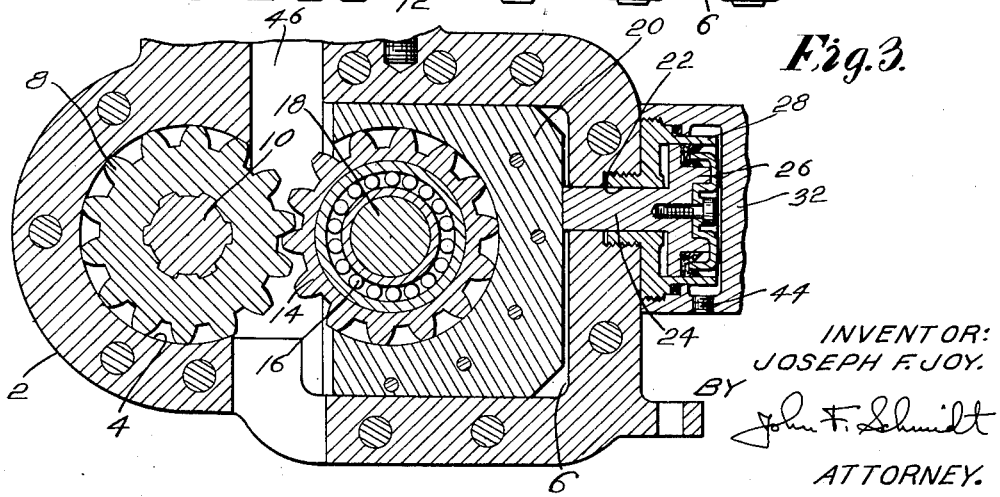
Fig. 3 is a view in section similar to Fig. 1, but showing the pump gears with their centers separated somewhat in order to reduce the pump displacement.

As can be seen in Figs. 1 and 3, there is a clearance between the right end of cylinder 28 and the end of cylinder head 32. This clearance permits the interior of the cylinder to communicate with a fluid connection 44. Fluid connection 44 is provided in order that a suitable pressure source such as the accumulator shown at 82 of my above-identified patent may communicate with the cylinder interior by way of a suitable conduit.

Operation

Regulation of the variable displacement pump will now be described in detail. There are many pump applications in which it is necessary, or at least desirable, to guard against over-loading of the pump drive motor. Such a safeguard is provided in a variable displacement pump made according to this invention. As is described in my above-identified patent, the accumulator there shown is connected by means of a suitable conduit to the cylinder 28. As will be understood by those skilled in the art, the accumulator will be so large that the volume change effected in the accumulator by the travel of piston 26 throughout its limit will be negligible, and accordingly, the pressure imposed upon piston 26 will be substantially constant. Under those circumstances, the resistance to relative displacement of the two pump gear centers imposed by the piston 26 and the accumulator will be substantially constant. This will result in providing a substantially constant load for the pump drive motor.

Figure 2:
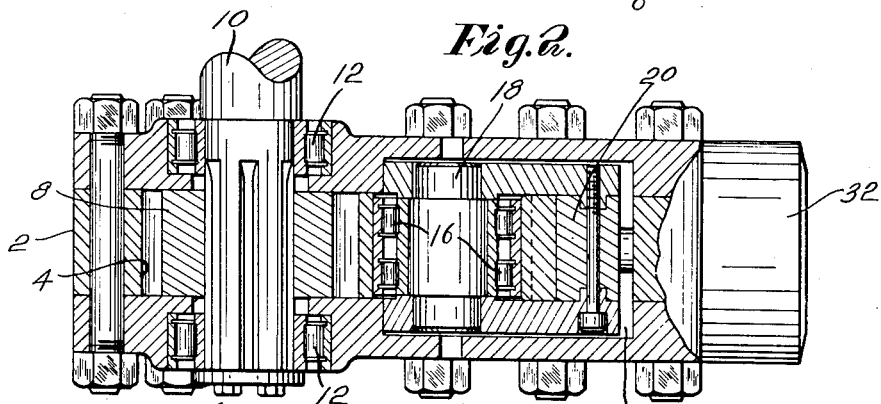
Fig. 2 is a view in section substantially on line 2—2 of Fig. 1.

As the pressure in the discharge or outlet 46 of the pump exceeds the permissible maximum, gear 14 begins to move to the right against the resistance of the accumulator, thus serving to unload the pump. This unloading of the pump by moving the centers of the gears apart permits the pump discharge pressure to drop slightly and as soon as that pressure has again been reduced to a permissible value the two gears return from the separated relationship shown in Fig. 3 to the fully meshed relationship shown in Figs. 1 and 2.

It will be noted that the piston rod 24 abuts against the right face of block 20 at some point above the line drawn through the two gear centers and extended toward the right. The purpose of this eccentric application of the resistance force is to overcome the unbalance caused by the higher (namely, pump discharge) pressure acting on the upper portion of block 20.

Although the above-identified parent patent of mine shows an accumulator as being connected with the cylinder 28, it will of course be understood by those skilled in the art that any other substantially constant pressure may be provided in place of an accumulator.

It will be evident to those skilled in the art that I have provided a variable displacement pump of simple design which will be inexpensive to manufacture, and which readily unloads upon the occurrence of an excessive discharge pressure to prevent damage to the pump drive motor. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

1. A pump comprising a casing having inlet and discharge passages, a pair of cooperating elements rotatably mounted in the casing about axes which lie in a substantially fixed plane, the inlet and discharge passages being disposed on opposite sides of said plane, one of the elements having spaced recesses and the other of the elements having spaced projections adapted to fit into said recesses to displace fluid therefrom, means movable in response to fluid pressure to vary the distance between the axes of rotation of the elements and being biased for movement in one direction by pressure in the discharge passage, and other fluid pressure responsive means comprising an expansible chamber device mounted on the casing and having an element engaging the distance varying means on the discharge passage side of said plane opposing said movement.

2. A pump comprising a casing having inlet and discharge passages, a pair of cooperating elements rotatably mounted in the casing about axes which lie in a substantially fixed plane, one of the elements having spaced recesses and the other of the elements having spaced projections adapted to fit into said recesses to displace fluid therefrom, pressure fluid responsive means movable to vary the distance between the axes of rotation of the elements and being biased for movement in one direction by discharge pressure applied thereto on one side of said plane and inlet pressure applied thereto on the other side of said plane, and other fluid pressure responsive means comprising an expansible chamber device having an element engaging the distance varying means on the discharge pressure side of said plane opposing said movement.

3. A fluid displacement device comprising a casing having inlet and discharge passages, a pair of cooperating intermeshing fluid displacement elements rotatably mounted in the casing for turning upon axes which lie in a substantially fixed plane, the inlet and discharge passages being disposed on opposite sides of said plane, means movable in response to fluid pressure to vary the distance between the axes of rotation of the elements and being biased for movement in one direction by pressure on the high pressure side of said fluid displacement elements, and means the resultant force of which acts on said distance varying means on the high pressure side of said plane opposing said movement.

4. A fluid displacement device having a casing comprising elements cooperating to form intercommunicating rotor chambers, a pair of cooperating intermeshing elements rotatably mounted in said rotor chambers for turning upon axes which lie in a substantially fixed plane and for movement one relative to the other, fluid supply and discharge passages communicating with said rotor chambers at points at opposite sides of said plane whereby forces effecting rotation of said intermeshing elements and tending to effect separative movement between said elements are provided, the resultant of said element separative force being greater on the high pressure side of said plane, and means for controlling the distance between the axes of rotation of said intermeshing elements opposing said first mentioned force, the resultant of said opposing force also greater on the high pressure side of said plane.

References Cited in the file of this patent

UNITED STATES PATENTS

| | | |
|---|---|---|
| 1,005,464 | Phelps | Oct. 10, 1911 |
| 1,670,229 | Balsiger | May 15, 1928 |
| 1,693,540 | Balsiger | Nov. 27, 1928 |
| 1,697,041 | Balsiger | Jan. 1, 1929 |
| 1,704,704 | Grant | Mar. 12, 1929 |
| 1,897,560 | Lawser | Feb. 14, 1933 |
| 1,943,929 | Rayburn | Jan. 16, 1934 |
| 2,600,632 | French | June 17, 1952 |
| 2,600,633 | French | June 17, 1952 |
| 2,612,114 | Ernst | Sept. 30, 1952 |
| 2,622,534 | Johnson | Dec. 23, 1952 |